(12) United States Patent
Modali et al.

(10) Patent No.: US 6,687,256 B2
(45) Date of Patent: Feb. 3, 2004

(54) RECOVERABLE CUT-THROUGH BUFFER AND METHOD

(75) Inventors: Prasad Modali, San Jose, CA (US); Anil Babu Nangunoori, Sunnyvale, CA (US); Nirmal Raj Saxena, Los Altos Hills, CA (US)

(73) Assignee: Alliance Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/325,104

(22) Filed: Dec. 19, 2002

(65) Prior Publication Data

US 2003/0112816 A1 Jun. 19, 2003

Related U.S. Application Data

(60) Provisional application No. 60/342,798, filed on Dec. 19, 2001.

(51) Int. Cl.[7] .......................... H04L 12/28; H04L 12/56
(52) U.S. Cl. ....................... 370/412; 370/428; 370/394; 370/401; 370/413
(58) Field of Search ................................. 370/412, 401, 370/402, 428, 394, 394.42, 413, 400, 911; 709/249

(56) References Cited

U.S. PATENT DOCUMENTS

| | | | | |
|---|---|---|---|---|
| 5,253,251 A | * | 10/1993 | Aramaki | 370/394 |
| 5,278,828 A | * | 1/1994 | Chao | 370/394 |
| 5,633,865 A | * | 5/1997 | Short | 370/412 |
| 6,094,434 A | * | 7/2000 | Kotzur et al. | 370/401 |
| 6,144,668 A | * | 11/2000 | Bass et al. | 370/401 |
| 6,389,480 B1 | * | 5/2002 | Kotzur et al. | 709/249 |
| 6,430,626 B1 | * | 8/2002 | Witkowski et al. | 709/249 |

\* cited by examiner

Primary Examiner—Wellington Chin
Assistant Examiner—Chuong Ho
(74) Attorney, Agent, or Firm—LaRiviere, Grubman & Payne, LLP

(57) ABSTRACT

The present invention provides a unique system and method for optimizing packet processing flow in a communications network by minimizing latency associated with packet-forwarding eligibility determinations. The present invention employs a speculative scheme with automatic recovery, including a two-way multithreaded implementation designed to overcome the aforementioned latency issue, including the functionality of enqueuing an incoming packet in both packet memory and a cut through buffer; determining the packet's eligibility for cutting through the buffer; and based on the determination, rolling back the unsuccessful process.

20 Claims, 5 Drawing Sheets

RECOVERABLE CUT-THROUGH BUFFER AND METHOD

RELATED APPLICATION

This application claims priority to U.S. Provisional Patent Application, Serial No. 60/342,798, filing date Dec. 19, 2001, the entire content of which is incorporated herein.

BACKGROUND OF THE INVENTION

1. Field of the Invention

The present invention relates generally to network management and control; and, more particularly to packet processing and flow determination.

2. Description of the Background Art

Current technology provides packet-switched networks, in which relatively small units of data called packets are delivered via the network to a destination address contained within each packet. Breaking communication down into packets allows the same data path to be shared among many users in the network. Most traffic over the Internet uses packet switching; therefore, the tremendous volume of Internet traffic results in a great magnitude of packet processing activity.

Packet processing, however, brings about issues of flow determination, particularly with regard to header lookup latencies; i.e., the delay in packet distribution incurred when the system processes packet header information to determine flow priority. Memory bandwidth is a critical aspect in any packet processing flow. As such, speculatively storing packet data into buffers hides header lookup latencies for flow determination, yet contributes to buffer overflow conditions.

What is needed, therefore, is a speculative packet disposition scheme with automatic recovery to alleviate the lookup delay associated with the determination of eligibility for cut through, while minimizing buffer overfill.

SUMMARY OF THE INVENTION

The present invention addresses the issue of the prior art and current art with a system and method for a speculative packet disposition scheme with automatic recovery. A "cut through" buffer (CTB) mechanism and system is proposed to reduce the synchronized dynamic random access memory (SDRAM) latency. The system and method provide support for pass through or store and forward of packets, including automatic recovery functionality. A two-way multithreaded implementation hides the latency of the eligibility determination process for packet forwarding operations to eliminate or minimize adverse performance issues associated with buffer overfill and processing latency.

In one embodiment, a method includes the steps of speculatively enqueueing duplicate packet data in packet memory and a cut through buffer; reading label information with a control unit from static random access memory (SRAM); determining if the packet is to remain enqueued in packet memory or cut through based on preexisting criteria; and, based on the determination made in the prior step, rolling back the ineligible enqueued process.

In another embodiment, a system comprises a cut through buffer having at least one basic unit having packet memory and packet descriptor, and a control unit for determining cut through eligibility.

Further advantages of the invention will be brought out in the following portions of the specification, wherein the detailed description is for the purpose of fully disclosing preferred embodiments of the invention without placing limitations thereon.

DETAILED DESCRIPTION OF THE INVENTION

The present invention provides a unique system and method for optimizing packet processing flow by minimizing latency associated with the cut through buffer (packet forwarding) and eligibility determinations. Typically, the present invention employs a speculative scheme with automatic recovery, including a two-way multithreaded implementation designed to overcome the aforementioned latency issue. Buffer overflow is minimized. A skilled artisan will recognize that the system and method disclosed herein may be implemented via a variety of ways, so long as the functionality described herein is provided.

Figure 1:
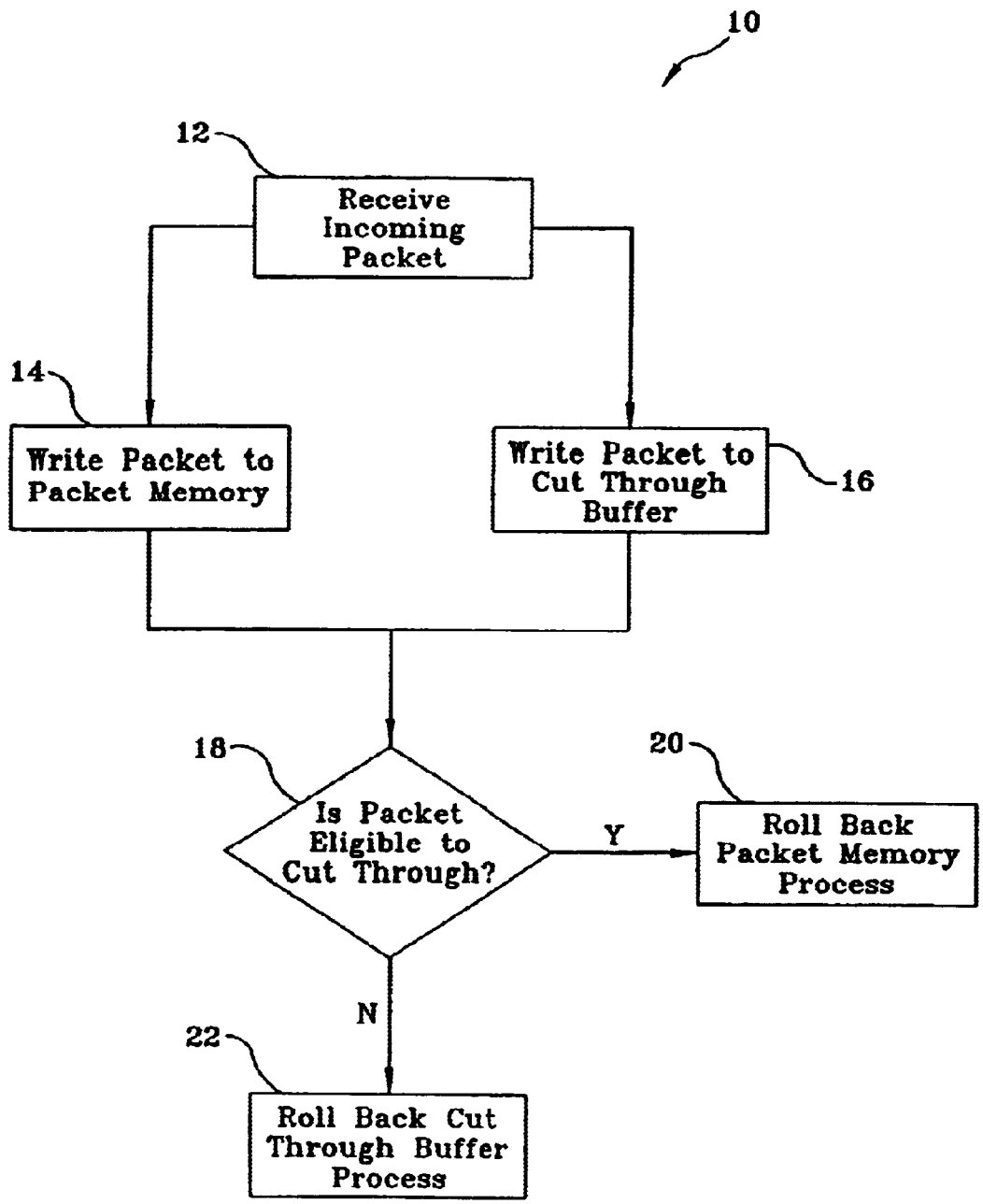
FIG. 1 illustrates a flowchart of steps included in a method according to the present invention.

Referring specifically to the drawings, wherein like references are made to the same items throughout, a method according to the present invention is generally exemplified stepwise in FIG. 1 at 10. The method includes the steps of receiving an incoming packet at 12; enqueuing the received packet in SDRAM memory (synchronized dynamic random access memory); i.e., packet memory 14; enqueuing the received packet in a cut through buffer 16; determining the received packet's eligibility for cut through processing 18; if the packet is eligible to cut through the buffer, then rolling back the received packet from packet memory 20; else rolling back the received packet from the cut through buffer 22.

Typically, packet memory facilitates storage of packets for store and forward-related processes; i.e., processes attendant to conditions wherein immediate processing of an incoming packet is delayed due to system determination, environment conditions, etc. By contrast, the cut through buffer facilitates storage of packets that will be processed on a pass through basis; i.e., deemed to be relatively high priority or other criteria and, therefore, processed before those packets not meeting the predetermined criterion.

Figure 2:
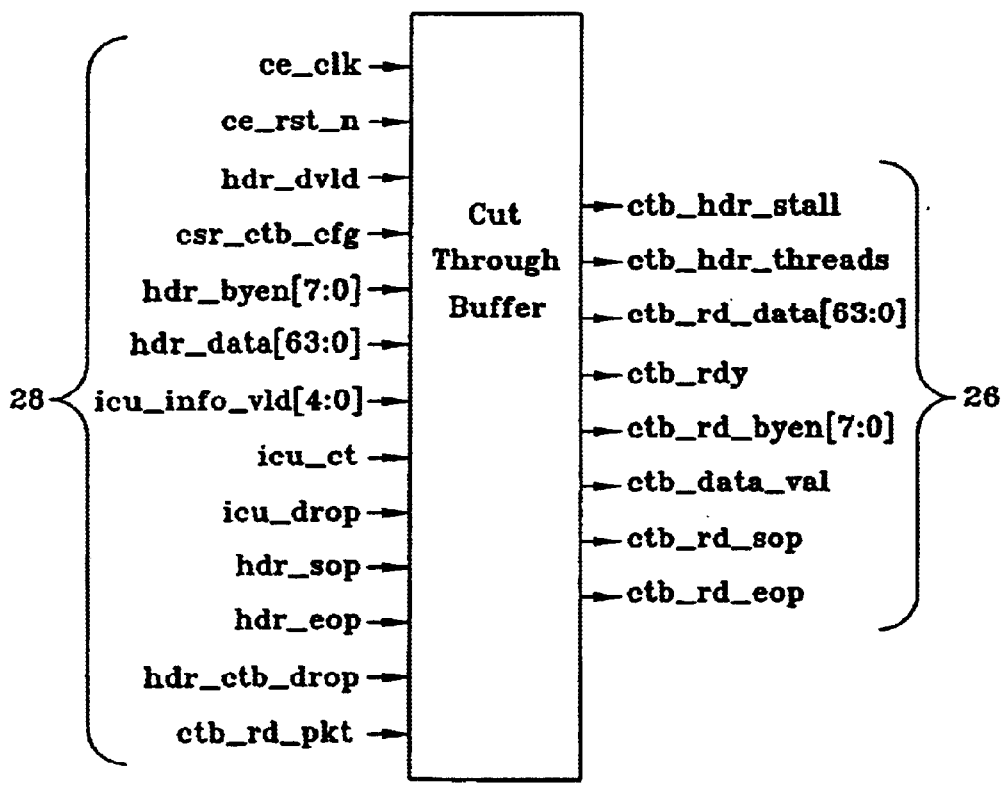
FIG. 2 illustrates a cut through buffer interface block diagram according to the present invention.

Turning now to FIG. 2, there is illustrated a cut through buffer interface block diagram according to the present invention. In certain embodiment, the signals include input signals 28 to the CTB and output signals 26 from the CTB. The following Table 1 entitled "Cut Through Buffer Interface Definition" defines each signal by name, width, direction (input to the CTB or output therefrom), and description. For example, ce_clk, has a width of one, is an input signal to the CTB, and refers to clock input to the CTB.

TABLE 1

Cut Through Buffer Interface Definition

| Signal Name | Width | Direction | Description |
|---|---|---|---|
| ce-clk | 1 | Input | Clock input to the CTB Unit |
| ce-rst-n | 1 | Input | Asynchronous reset signal |
| hdr-dvld | 1 | Input | Data valid signal from the header processor. This signal has to stay active during the write data transfer. The CTB stalls the writes and maintains the write pointer information when the signal goes low and resumes data transfer when the signal goes back to high again. The header processing block can use this feature for forward data flow control. |
| csr_ctb_cfg | 1 | Input | This Is a configuration signal for CTB.<br>0 - Packet can be read as soon as it is committed.<br>1 - Packet can be read only after it is committed and EOP signal is received. |
| hdr_byen | 8 | Input | This byte enable signal is used to indicate the valid bytes in the packet during the last element transfer. |
| hdr_data | 64 | Input | Write data into the CTB packet memory from Header Processor. |
| icu_info_vld | 5 | Input | Information valid signal from Ingress Control Unit. |
| Icu_ct | 1 | Input | Signal indicating whether packet is cut-through or queued. This is valid when icu_info_vld is equal to 5'b0_0001.<br>1 - cuthrough<br>0 - queued |
| icu_drop | 1 | Input | Signal indicates that the speculative packet enqueuing is invalid and has to be rolled back. The CTB uses this signal to cancel and reset the write pointers for the next incoming packet. This is valid only when icu_info_vld is equal to 5'bO_1000.<br>1 - Cancel<br>0 - Commit |
| hdr_sop | 1 | Input | "Start of Packet" signal indicates that this is the first cycle of new packet data being sent from the header processor. |
| hdr_eop | 1 | Input | "End of Packet" signal indicates that this is the last cycle of the current packet data being sent from the header processor. This is used by the CTB to update the packet descriptor information if packet is committed. |
| hdr_ctb_drop | 1 | Input | Drop signal from Header processor. The packet is dropped only if you get the signal before packet Is committed. |
| ctb_rd_pkt | 1 | Input | Read valid signal from the agent unit to read the next packet data from the CTB. This signal should be generated by agent only when ctb_rdy Is active and ctb_data_val is not there. This signal should remain active only for 1 clock cycle period. |
| ctb_hdr_stall | 1 | Output | Signal indicating that the CTB packet memory Is going to become full. It can accept only two words after the assertion of ctb_hdr_stall. |
| ctb_hdr_threads | 1 | Output | 1 means both threads are busy and no more new packets can be accepted.<br>0 means cm is ready to accept a new packet. |
| ctb_rd_data[63:O] | 64 | Output | Data read from CTB. |
| ctb_rdy | 1 | Output | Signal indicating the CTB Is ready to be read. |
| Ctb_rd_byen[7:0] | 8 | Output | Read byte enable for the last element |
| ctb_da_val | 1 | Output | Validating signal for ctb_rd_data. |
| ctb_rd_sop | 1 | Output | Read "Start of packet" signal. |
| ctb_rd_eop | 1 | Output | Read "End of Packet" signal. |

Figure 3:
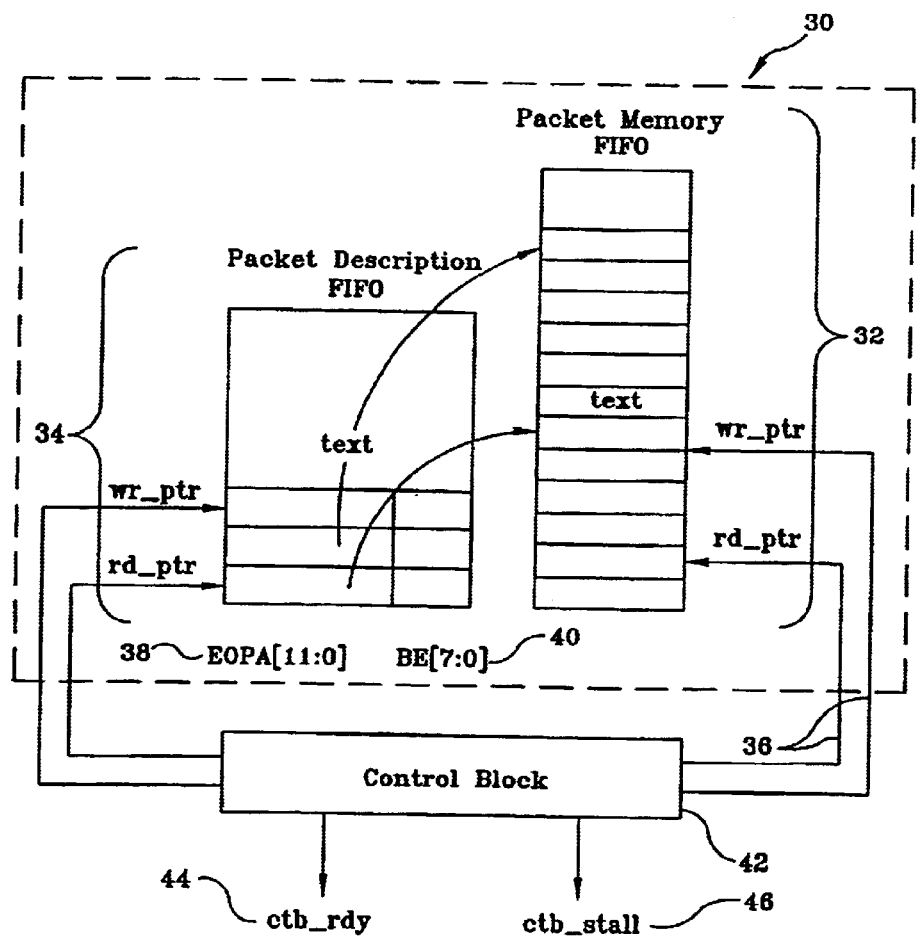
FIG. 3 illustrates a block diagram of a basic unit of a speculative cut through buffer according to the present invention.

FIG. 3 illustrates a block diagram of a typical basic unit of a speculative cut through buffer according to the present invention. The CTB typically includes two basic units 30, each of which can be configured as follows. The basic unit 30 includes packet memory 32 and packet descriptor 34. In various embodiments, the basic unit 30 has a 16 KB on-chip SRAM (static random memory) packet memory organized as a ring buffer or FIFO (first in, first out) to support a maximum of two MTUs (maximum transmission unit; i.e., the largest size packet that can be sent in a packet-based network). Each entry in packet memory 32 is eight bytes or sixty four bits wide (hereafter, element). The packet memory 32 has a total of 2K elements with internal read/write pointers 36 and full/empty status signals (described below). The read/write pointers 36 are managed through a separate 2 KB packet descriptor 34 for packet memory 32. The packet descriptor 34 has a total of 512 elements, and may be configured as FIFO. Each element has a width of twenty bits. Twelve bits are needed for storing End of packet (EOPA 38) and eight bits are needed to store byte enable (BE 40) corresponding to last element in a packet. A control block 42 interacts with the basic unit 30 via the read/write pointers 36 and outputs various signals such as ctb_rdy 44 (a signal indicating the CTB is ready to be read, having an empty) and ctb_stall 46 (a signal indicating that packet memory 32 is approaching its capacity threshold and can accept only a predetermined number of words; e.g., two words). In certain embodiments, the control block 42 may also provide the functionality necessary to determine whether a packet will be dropped; e.g., employing a general or specific algorithm comprising random early detection logic, and variations thereof.

Figure 4:
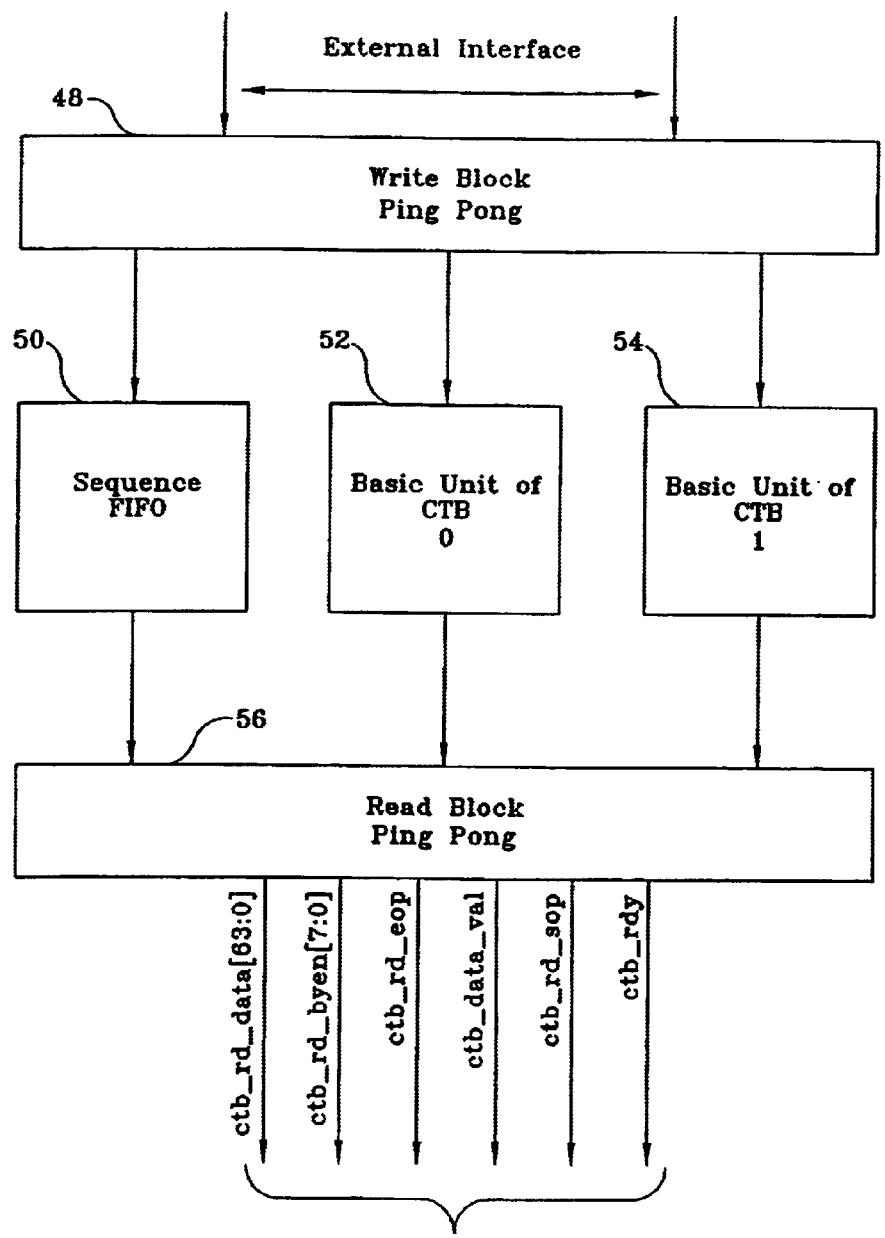
FIG. 4 illustrates an internal block diagram of the cut through buffer according to the present invention.

With reference to FIG. 4, there is illustrated an internal block diagram of the CTB, including a write block 48 that interfaces with an external interface (not shown); a sequence block 50; a basic unit 0 block 52; a basic unit 1 block 54; and a read block 56. The write block 48 writes packets alternatively into the two basic units of the CTB, basic unit 0 52 and basic unit 1 54. Start of packet (SOP), end of packet (EOP), write data, data valid signals, commit, cancel, and hdr_ctb_drop (see Table 1) signals are "ping-ponged" between the two basic units 52 and 54.

The sequence block 50, which may be configured according to a FIFO schema, maintains the order in which commit signals are received. If a cancel signal is received for a packet, then the sequence block 50 will not be updated. This is useful during read operations to send packets in the same order as which they were received.

The read block 56 first reads the sequence block 50. Based on the read data from the sequence block 50, the corresponding basic unit of the CTB is read; i.e., either the basic unit 0 52 or the basic unit 1 54. In certain embodiments, the width of the sequence block is one bit and the depth is 1024 bits. The read block outputs various valid signals generally depicted at 58.

Figure 5:
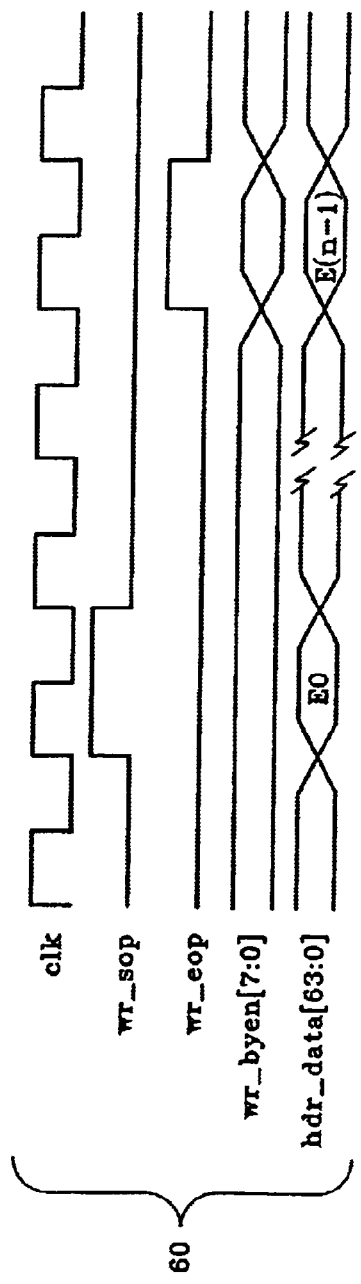
FIG. 5 illustrates a signal diagram depicting writing to the cut through buffer.

Turning to FIG. 5, there is illustrated a signal diagram depicting writing to the CTB, including write signals 60 of clk, wr_sop, wr_eop, wr_byen, and hdr_data (please refer to Table 1). For writing a packet to the CTB, the wr_sop signal is asserted along with the hdr_dvld (data valid) signal. Writing is designed to be completed only if there are no stall signals and threads are available. Alternatively, the CTB accepts a predetermined number of elements after assertion of a stall signal: e.g., two data elements, provided pipeline stages for a header processor unit have been taken into account. When the last element of the packet is written, wr_eop signal, a byte enable signal, wr_byen, is received. The packet is discarded on receipt any time of a cancel signal from the control block 42.

Figure 6:
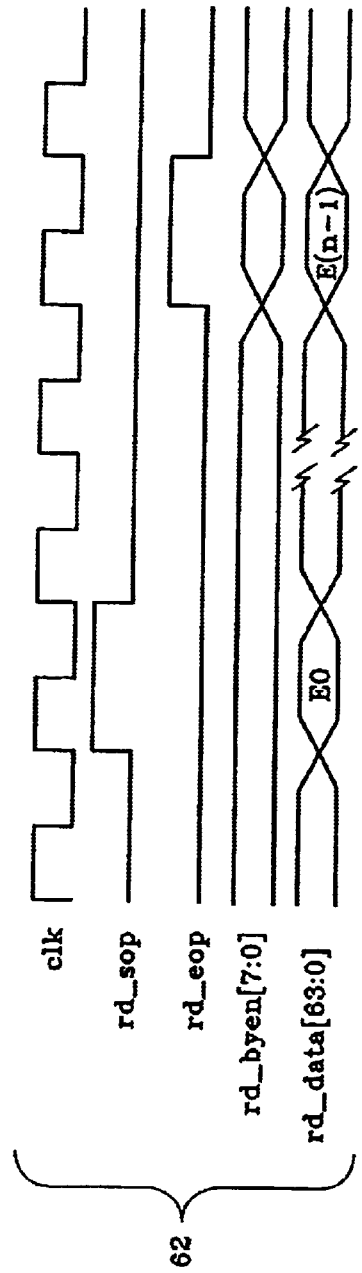
FIG. 6 illustrates a signal diagram depicting reading from the cut through buffer.

With reference to FIG. 6, there is illustrated a signal diagram depicting reading from the CTB, including read signals 62 of clk, rd_sop, rd_eop, rd_byen, and rd_data (please refer to Table 1). In various embodiments, a packet may be read in two modes. The first mode occurs when csr_ctb_cfg is '1', then the packet can be read immediately after reception of the commit signal. A read request signal should be asserted only on assertion of a ctb_rdy signal. The width of the ctb_rd_pkt (read request) signal should be only one clock cycle period. The ctb_data_val signal validates the data output from the CTB. Preferably, read request signals are generated only after all elements of a packet have been received.

Having illustrated and described the principles of the system and method of the present invention in various embodiments, it should be apparent to those skilled in the art that the embodiment can be modified in arrangement and detail without departing from such principles. For example, the implementation of specific signals may be changed if preferred. Therefore, the illustrated embodiments should be considered only as example of the invention and not as a limitation on its scope. Although the description above contains much specificity, this should not be construed as limiting the scope of the invention but as merely providing illustrations of some of the presently preferred embodiments of this invention. Further, it is appreciated that the scope of the present invention encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention for it to be encompassed by the present claims. Furthermore, no element, component, or method step in the present disclosure is intended to be dedicated to the public regardless of whether the element, component, or method step is explicitly recited in the claim. No claim element herein is to be construed under the provisions of 35 U.S.C. 112, sixth paragraph, unless the element is expressly recited using the phrase "means for".

What is claimed is:

1. A method for flow determination in a packet-switched network, the method comprising the steps of:

speculatively enqueuing packet data in packet memory and a cut through buffer;

reading label information;

determining if the packet is to remain enqueued in packet memory or the cut through buffer;

based on the determination, rolling back the ineligible enqueued process.

2. The method of claim 1, further comprising an initial step of receiving an incoming packet.

3. The method of claim 1, further comprising a step of determining if the packet is to be discarded.

4. The method of claim 1, further comprising the step of providing at least one basic unit associated with the cut through buffer.

5. The method of claim 4, wherein each basic unit comprises packet memory and packet descriptor.

6. The method of claim 5, wherein the packet memory further comprises 16 KB on-chip SRAM.

7. The method of claim 5, wherein packet memory is configured according to a schema selected from a group consisting essentially of FIFO schema and ring schema.

8. The method of claim 1, wherein the cut through buffer further comprises a control unit.

9. The method of claim 8, wherein the control unit further comprises a random early detection component for determining whether a packet is to be dropped.

10. The method of claim 1, further comprising a step of providing at least one input signal to the cut through buffer.

11. The method of claim 10, wherein the at least one input signal is selected from a group consisting essentially of ce_clk, ce_rst_n, hdr_dvld, csr_ctb_cfg, hdr_byer, hdr_data, icu_info_vld, icu_ct, icu_drop, hdr_sop, hdr_eop, hdr_ctb_drop, and ctb_rd_pkt.

12. The method of claim 1, further comprising a step of providing at least one output signal from the cut through buffer.

13. The method of claim 12, wherein the at least one output signal is selected from a group consisting essentially of ctb_hdr_stall, ctb_hdr_threads, ctb_rd_data, ctb_rdy, ctb_rd_byen, ctb_data_val, ctb_rd_sop, ctb_rd_eop.

14. A system for packet flow determination in a packet-switched network, the system comprising:

a cut through buffer adapted to speculatively enqueue an incoming packet thereby initiating a cut through buffer process;

a packet memory adapted to speculatively enqueue the incoming packet thereby initiating a packet memory process; and a control unit adapted to determine if the enqueued packet is eligible for the cut through buffer process, and to roll back the cut through buffer process if the packet is not eligible for the cut through buffer process, and to roll back the packet memory process if the packet is eligible for the cut through buffer process.

15. The system of claim 14, further including at least one basic unit comprising the packet memory and a packet descriptor adapted to manage read/right points for the packet memory.

16. The system of claim 15, wherein the packet memory further comprises 16 KB on-chip SRAM.

17. The system of claim 15, wherein packet memory is configured according to a schema selected from a group consisting essentially of FIFO schema and ring schema.

18. A method for flow determination in a packet-switched network, the method comprising the steps of:

speculatively enqueuing a packet in a cut through buffer process;

speculatively enqueuing the packet in a packet memory process;

determining if the packet is eligible for the cut through buffer process;

if the packet is eligible for the cut through buffer process, rolling back the packet memory process; and if the packet is not eligible for the cut through buffer process, rolling back the cut through buffer process.

19. The method of claim 18 wherein determining if the packet is eligible for the cut through buffer process comprises using a control block to determine if the packet is eligible for the cut through buffer process comprises.

20. The method of claim 19 wherein using a control block to determine if the packet is eligible for the cut through buffer process includes reading label information to determine if the packet is eligible for the cut through buffer process.

\* \* \* \* \*